United States Patent
Hron, II et al.

(10) Patent No.: US 11,909,858 B1
(45) Date of Patent: Feb. 20, 2024

(54) SYSTEM AND METHOD FOR GENERATING AND PERFORMING A SMART CONTRACT

(71) Applicant: Thomson Reuters Enterprise Centre GmbH, Zug (CH)

(72) Inventors: Joel M. Hron, II, The Woodlands, TX (US); Nicholas E. Vandivere, Spring, TX (US); Michael B. Kuykendall, Spring, TX (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 991 days.

(21) Appl. No.: 16/448,875

(22) Filed: Jun. 21, 2019

Related U.S. Application Data (60) Provisional application No. 62/688,229, filed on Jun. 21, 2018.

(51) Int. Cl.
  *H04L 9/06* (2006.01)
  *G06F 16/182* (2019.01)
  *G06F 40/30* (2020.01)

(52) U.S. Cl.
  CPC ........ *H04L 9/0637* (2013.01); *G06F 16/1824* (2019.01); *G06F 40/30* (2020.01)

(58) Field of Classification Search
  None
  See application file for complete search history.

(56) References Cited

U.S. PATENT DOCUMENTS

| | | | |
|---|---|---|---|
| 10,373,159 B2* | 8/2019 | Ardashev | G06Q 50/18 |
| 10,666,424 B1* | 5/2020 | Rutley | H04L 9/0637 |
| 10,679,221 B1* | 6/2020 | Rutley | G06F 16/951 |
| 11,361,388 B1* | 6/2022 | Floyd | G06Q 40/08 |
| 11,367,071 B2* | 6/2022 | Gonzales, Jr. | G06F 21/62 |
| 11,416,956 B2* | 8/2022 | Wodetzki | G06V 30/1985 |
| 11,494,836 B2* | 11/2022 | Cella | G06F 16/27 |
| 11,734,770 B2* | 8/2023 | Leise | H04L 9/0637 705/4 |
| 11,770,239 B1* | 9/2023 | Rutley | G06F 11/3476 713/189 |
| 2017/0103472 A1* | 4/2017 | Shah | H04L 9/32 |
| 2017/0287090 A1* | 10/2017 | Hunn | G06F 21/64 |
| 2018/0005186 A1* | 1/2018 | Hunn | G06F 16/219 |
| 2018/0365201 A1* | 12/2018 | Hunn | G06Q 10/0838 |
| 2019/0034404 A1* | 1/2019 | Anderson | G06F 40/186 |
| 2019/0080284 A1* | 3/2019 | Kim | G06Q 50/28 |
| 2019/0205870 A1* | 7/2019 | Kamalsky | H04L 63/102 |
| 2019/0213258 A1* | 7/2019 | Bacarella | H04L 9/3239 |
| 2019/0213259 A1* | 7/2019 | Bacarella | H04L 9/3239 |
| 2019/0243912 A1* | 8/2019 | Duraisamy Soundrapandian | G06Q 50/18 |

(Continued)

OTHER PUBLICATIONS

ConsenSys; A 101 Noob Intro to Programming Smart Contracts on Ethereum; 2015; retrieved from the Internet https://medium.com/@ConsenSys/a-101-noob-intro-to-programming-smart-contracts-on-ethereum-695d15c1dab4; pp. 1-38 (Year: 2015).*

*Primary Examiner* — Michael W Chao
(74) *Attorney, Agent, or Firm* — Polsinelli PC (57) ABSTRACT

A semantic parser can process natural language of a traditional contract to generate variables and rules which can be implemented in a smart contract. The smart contract can be provided to a distributed ledger, such as a blockchain network, to execute the smart contract. Execution of the smart contract can be documented in the distributed ledger and in association with the smart contract.

20 Claims, 6 Drawing Sheets

(56) References Cited

U.S. PATENT DOCUMENTS

| | | | | |
|---|---|---|---|---|
| 2021/0304317 A1* | 9/2021 | Leise | ...................... | H04W 4/38 |
| 2022/0398680 A1* | 12/2022 | Wodetzki | ............... | G06Q 10/10 |
| 2023/0162304 A1* | 5/2023 | Hunn | ................... | G06Q 50/188 |
| | | | | 707/798 |
| 2023/0298108 A1* | 9/2023 | Bryant | ................ | G06Q 30/0283 |
| | | | | 705/4 |

* cited by examiner

SYSTEM AND METHOD FOR GENERATING AND PERFORMING A SMART CONTRACT

CROSS-REFERENCE TO RELATED APPLICATION

This application is related to and claims priority under 35 U.S.C. § 119(e) from U.S. Patent Application No. 62/688,229, filed Jun. 21, 2018 entitled "System and Method for Generating and Performing a Smart Contract," the entire contents of which is incorporated herein by reference for all purposes.

TECHNICAL FIELD

The present invention relates to converting contract documents into computer executable smart contracts.

BACKGROUND

Smart contracts, contractual agreements which are provided in software executable code, are increasingly prevalent utilities for various transactions. Smart contracts may provide parties to the contract a stronger guarantee of security and diligence due to their automated, software executable nature. The terms of a smart contract are encoded in the software executable code and so are always performed in a precise and reproducible fashion. Smart contracts can also interact directly with other software and thus may be stored on one or more platforms and provide a precise history which may be reported out to various software services or platforms. For example, a smart contract may automatically record a payment between parties' accounts or continuously monitor a revenue stream or number of units sold. Further, the smart contract can be designed to automatically transfer funds between accounts owned by parties to the contract or can issue an automated notice upon specified threshold values being observed (e.g., number of units sold falls below a specified minimum).

Currently, the vast majority of contractual agreements are in paper form. Where contracts are digitized at all, they are often only preserved as scanned images of the documents and provide no further functionality. Businesses can manually convert existing contracts to smart contracts, but this is often a tedious and expensive task. Furthermore, conversion of contracts to smart contracts is prone to error and inconsistent implementation due to different coders working on different contracts. The contracts themselves may be inconsistently formatted and use inconsistent nomenclature. Where implementation is inconsistent, error and bug checking is more difficult due to increased variability in format and style. An incorrectly implemented smart contract can be exploited by malicious actors or even have unintended consequences due to errors in the underlying code.

It is with these observations in mind, among others, that aspects of the present disclosure were concerned and developed.

DETAILED DESCRIPTION

Aspects of the present disclosure involve systems and methods for automatically generating a smart contract from a conventional, initially paper-based, contract. Numerous examples of conventional contracts are possible, including a lease, a license, a supply agreement, and other contracts. To initiate generation of a smart contract, the conventional contract is processed into a digital text base through optical character recognition ("OCR") software or is received as a digital text document. The text is then parsed by a natural language processing ("NLP") engine in order to identify the parties and obligations described in the conventional contract, which are then saved as data structures. The data structures may then be further used by the system to generate and assemble software executable code. The executable software code is operably organized. In other words, the software executable code is structured such that it may be performed as a smart contract by a receiving system.

Once the smart contract is generated, it may be stored on various media and the smart contract code can be executed on a local device, remote device, or on a network of devices. For example, the smart contract can be provided to a blockchain network for software execution of the smart contract code and the blockchain network may record the resultant actions of the smart contract. The smart contract may itself be a root block to a blockchain maintained by the blockchain network. The blockchain network can be a private network hosted by a third party not party to the contract at hand or it may be hosted by all parties to the contract. When hosted by each party to the contract, blocks can be added to the smart contract blockchain only after the addition is validated by each party.

Further, the smart contract can receive relevant data used to verify and/or update obligations included in the smart contract. The relevant data can be manually provided to the smart contract over a computer, mobile device, smartphone, or other terminal. In some examples, the smart contract can retrieve or passively receive relevant data through data feeds provided by third parties, commercial venders, directly from devices outputting data, and other sources. Further, the data provided to the smart contract can itself be recorded in a data structure so that a historical record of inputs to the smart contract can be reviewed at a later time. For example, where a smart contract calls for a minimum production output from certain specified devices, the devices may provide a production log in the form of a device blockchain associated with each device. The device blockchain can be stored in a third party data store or by each party to the contract in similar fashion to the smart contract itself.

The smart contract can be produced by a semantic cross-compiler which translates natural language text into software executable code in a language associated with the target smart contract language. Multiple smart contract platforms exist such as, for example and without imputing limitation, Ethereum®. In some cases, multiple target software languages may be available for cross-compilation to a smart contract platform. Ethereum®, for example, allows for smart contracts to be written in Solidity and Serpent, among other software languages. Further, for platforms containing a virtual machine ("VM") such as Ethereum®, the semantic cross-compiler may target the VM bytecode for target compilation, in which case machine code instructions may be generated and will be directly interpretable by the smart contract platform.

Figure 1A:
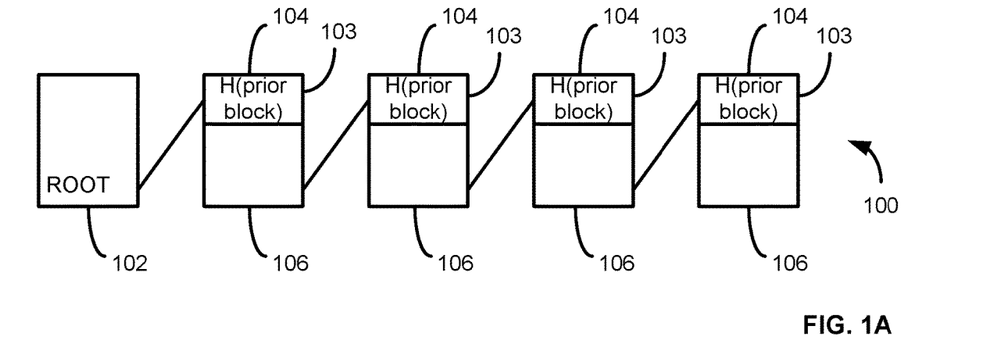
FIG. 1A is a diagram illustrating an example of a blockchain data structure that may implement various systems and methods discussed herein, in accordance with various embodiments of the subject technology.

FIG. 1A illustrates a blockchain data structure 100 which can provide an immutable record of a series of data. The blockchain data structure 100 is made of blocks 106 each linked to a preceding block 106 or a root 102 by a hash of the preceding block contents stored in a header 103 of each block 106. The root block 102, may store dummy data or can store initial contextual data related to, for example, the starting values of a device or devices associated with the blockchain. In some examples, the root block 102 may store a smart contract and blocks 106 can store values related to (e.g., provided to or output by) the smart contract of the root block 102.

Figure 1B:
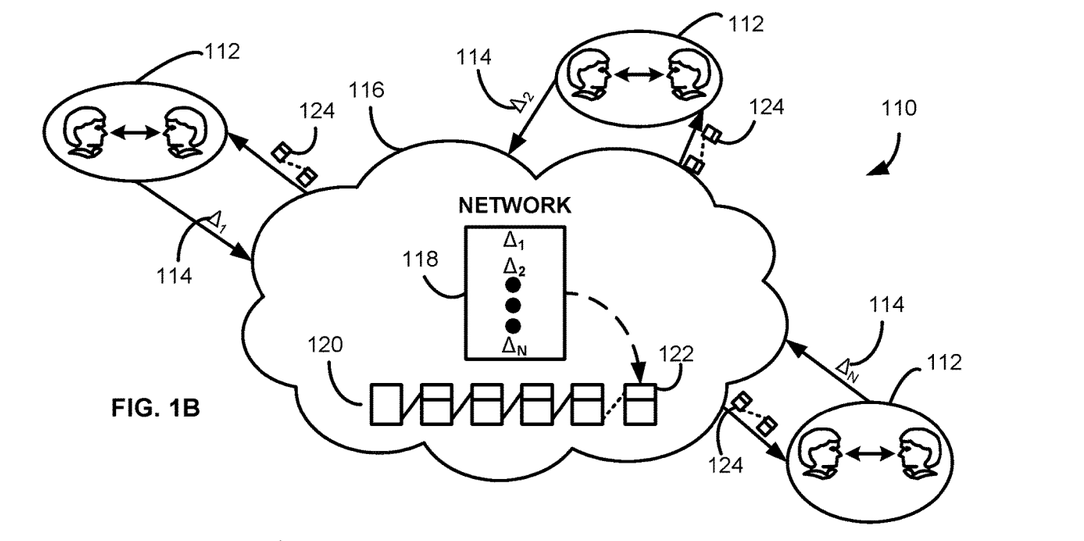
FIG. 1B is a system diagram illustrating a distributed ledger blockchain network that may implement various systems and methods discussed herein, in accordance with various embodiments of the subject technology.

FIG. 1B depicts a system 110 which can manage a blockchain 120, such as the blockchain data structure 100 discussed above, on a network 116. The system 110 can be provided as a distributed system over a network of computers connected over the Internet or hosted by a single trusted entity acting as an administrator. Regardless, the network 116 can receive records 114 which provide a digital representation of an event or transaction 112. In some examples, the event or transaction 112 may include execution of a conventional contract such as, for example and without imputing limitation, an oil and gas lease between two parties. The conventional contract can then be converted into a smart contract to be included in a record 114 for software execution on the network 116. In other examples, the transaction 112 may be an update to an existing smart contract, such as an amendment and the like, or information related to the software execution of a smart contract stored in the root node 102 of a blockchain, such as a revenue related to a property leased under a smart contract.

In some examples, the network 116 may only process the record 114 if all parties to the underlying transaction 112 transmit a copy of the record 114 to the network 116. Once the network 116 receives the record 114 and validates it according to a predetermined protocol, the record 114 can be stored with other transactions in a pool 118. The network 116 can then add the pool 118 onto the end of the blockchain 120 to create an updated blockchain 122.

The updated blockchain 122 may be transmitted back out to all participants in the network 116. By transmitting the updated blockchain 122 to all participants in the network 116, each participant can maintain an up-to-date version of the blockchain being managed. For example, the network 116 can manage a blockchain for a smart contract related to an oil and gas lease. The network 116 can receive an amendment as a record 114 and may appended the record 114 of the amendment to the appropriate smart contract blockchain as part or all of a new block. The updated smart contract blockchain can then be automatically transmitted to each party to the agreement (and presumably the amendment).

Figure 1C:
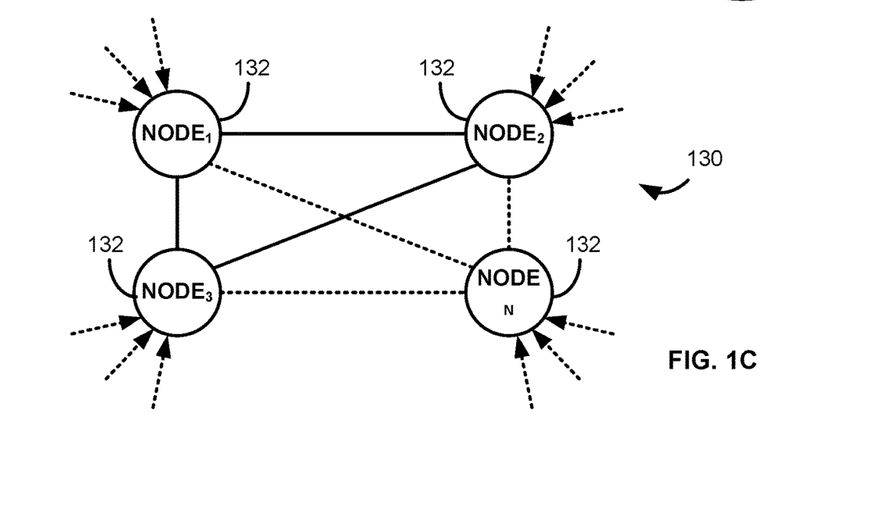
FIG. 1C is a system diagram illustrating a network of nodes that may implement various systems and methods discussed herein, in accordance with various embodiments of the subject technology.

As depicted by FIG. 1C, the network 116 can include multiple nodes 132. Each node 132 may each communicate with each every other node 132 to create a fully connected node network 130. In other examples, each node 132 may communicate with a unique subset of other nodes 132 in order to provide full coverage across the entire node network 130 without having to have each node 132 manage communications with every single other member of the node network 130.

Figure 2:
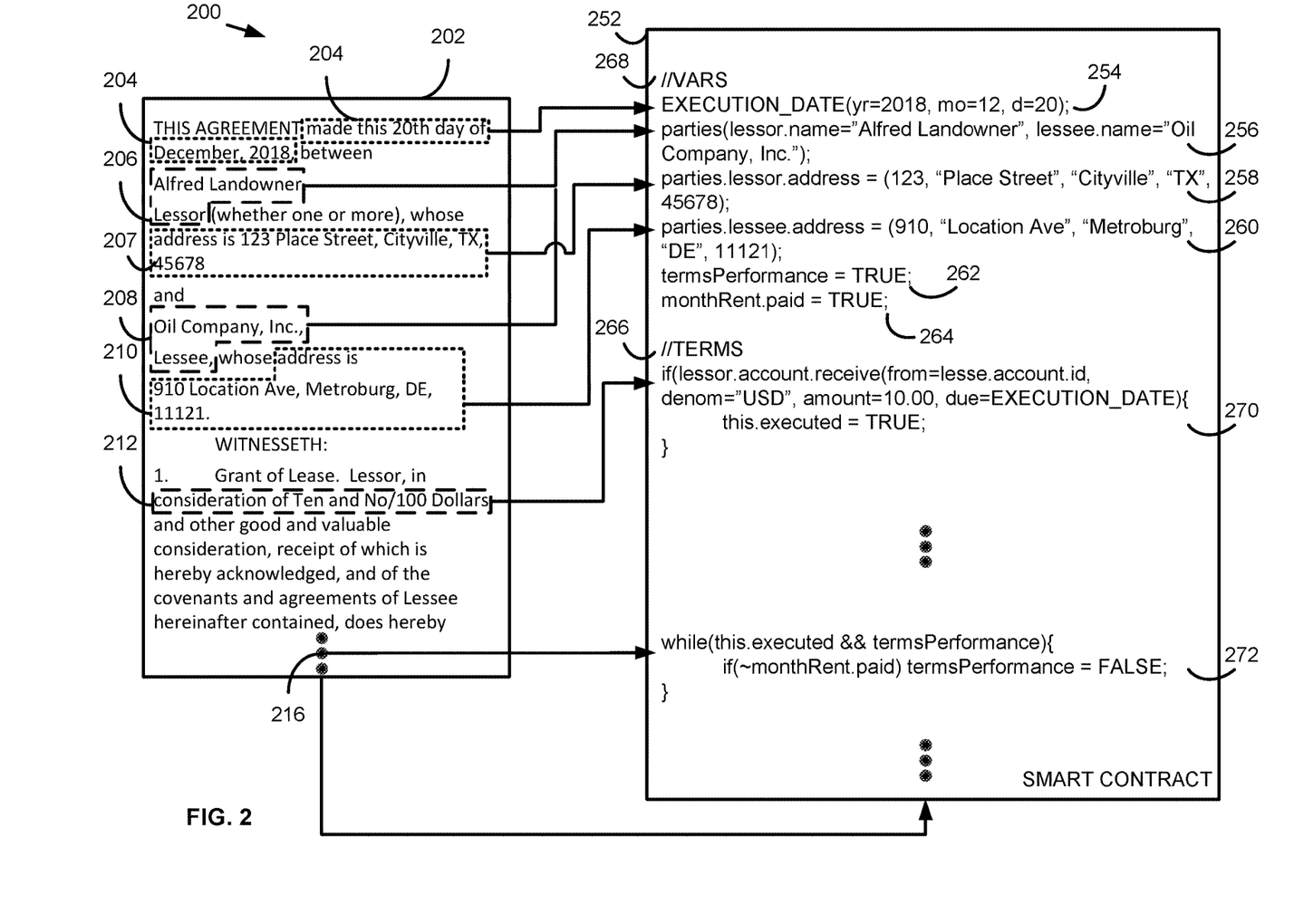
FIG. 2 is a diagram illustrating converting a traditional contract into a smart contract, in accordance with various embodiments of the subject technology.

FIG. 2 depicts a mapping 200 between a conventional contract 202 and a smart contract 252. The smart contract 252 may include executable code equivalents of the definitions and obligations described in the conventional contract 202. For example, party names may be converted into variable definitions and obligations may be converted into executable functions or algorithms.

Figure 3:
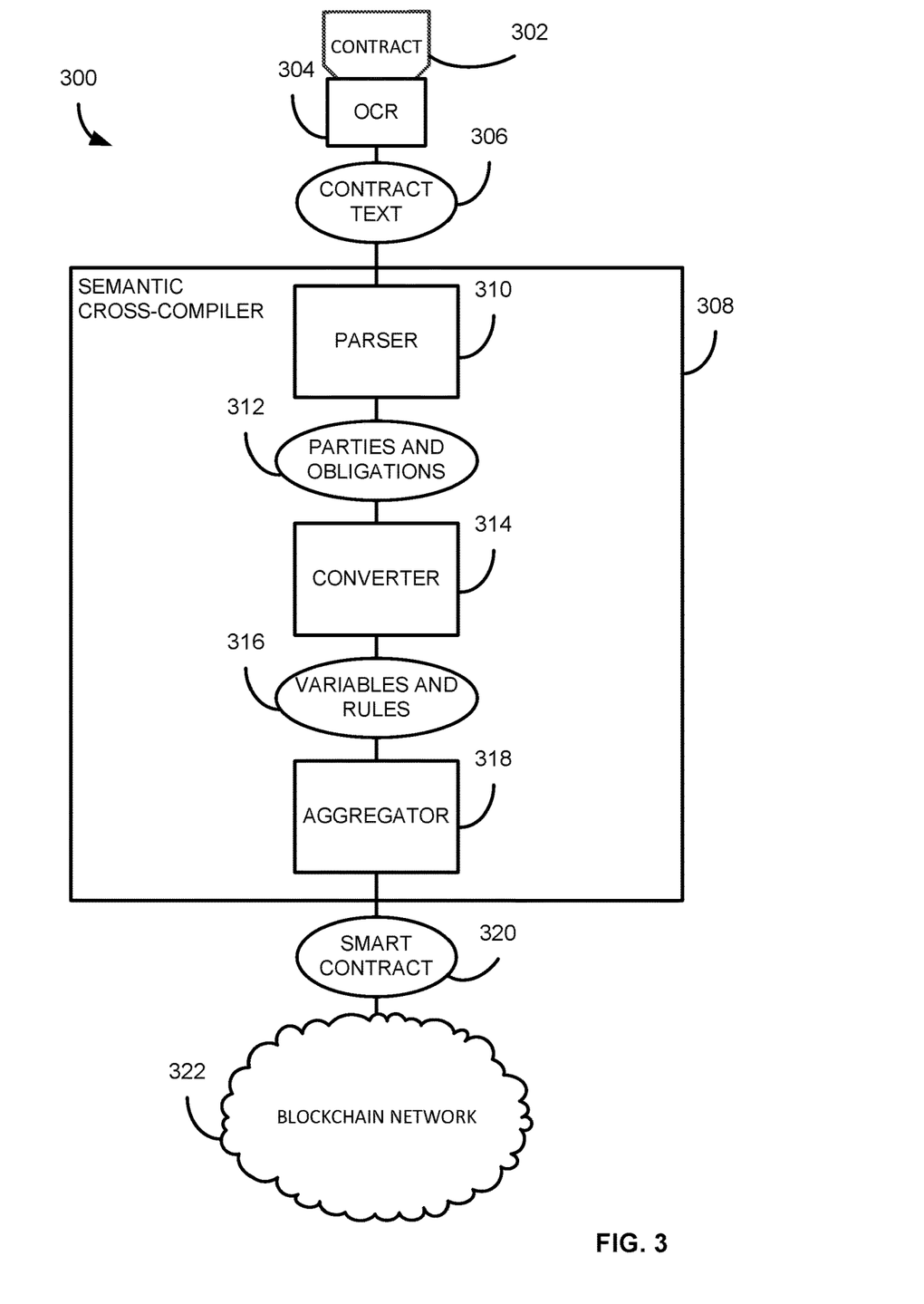
FIG. 3 is a diagram illustrating a smart contract generation system, in accordance with various embodiments of the subject technology.

FIG. 3 depicts an illustration of a conversion system 300 for processing a document, such as the conventional contract 202, into a smart contract 320, such as the smart contract 252 of FIG. 2. Once generated, the smart contract 320 may be transmitted to a blockchain network 322 for recording by participating parties and software execution of the functions encoded in the smart contract 320. The conversion system 300 can be hosted on a local computer or may be provided as a cloud based service accessible through a web portal. In some examples, the conversion system 300 may be interacted with via desktop computer, mobile device, laptop computer, smartphone, and the like.

The conversion system 300 receives a contract 302, such as the conventional contract 202, in any of multiple formats. For example, the contract 302 can be received as a raw text document. In other examples, it may be received as a document image or scan such as, for example and without imputing limitation, a PDF, JPEG, TIFF, and similar file format. When received as a document image, an OCR module 304 can process the document image and produce a contract text output 306 which may provide downstream services and processes with a text version of the received contract 302. In some examples, the OCR module 304 is a commercial product. In some examples, the OCR module 304 can be a specialized service 304 trained at converting image to text data for specialized fields. The OCR module 304 can also include domain specialized error correction elements. For example, multiple image-to-text models may be architected into a system for identifying appropriate corrections or otherwise missing words to be inserted into the document text output 306 that may be scanned in incorrectly due to issues such as, for example and without imputing limitation, illegible script, interference with the scanning process, misidentified words by a first step image-to-text conversion of the OCR module 304, and the like.

Once the contract text output 306 is generated by the OCR module 304, it may be provided to a semantic cross-compiler 308 in order to process the natural language of the text and convert it into a computer recognizable smart contract format, such as the smart contract 252. The semantic cross-compiler 308 can be hosted on the same device as the OCR module 304 or may be on a separate device. In some examples, each system component can be provided as a microservice and distributed across one or more devices or virtual and non-virtual components.

The semantic cross-compiler 308 itself may include a parser 310, a converter 314, and an aggregator 318. The parser 310 can process a contract text 306 to identify portions of the contract text 306 to be converted into appropriate variables and data objects for inclusion in the smart contract 320. For example, a lessor party identification 206 can be identified in a conventional contract 202 by the parser 310. The parser 310 can identify the portions of the contract text 306 to be converted into variables and data objects by probabilistic, rules-based, and/or trained model approaches. In some examples, one or more trained language model may be used to classify particular text portions as one of a selection of potential classifications including variables related to party name, party contact information, dates, value amounts, percentages, and the like. Similarly, a trained language model can identify particular portions of text as being mappable to functions such as in the case of consideration requirements 212 necessary for the execution of the agreement and the like. In other examples, the parser 310 may use a mixed rules- and model-based approach. In some examples, multiple trained language models may be used to classify natural language such as described in further detail in application Ser. No. 15/887,689, filed Feb. 2, 2018 and entitled "NATURAL LANGUAGE PROCESSING SYSTEM AND METHOD FOR DOCUMENTS," hereby incorporated by reference in its entirety. The natural language may be classified into variables, functions, data objects, and the like.

The parser 310 may produce a parser output 312 which includes parties and obligations described by the received contract 302 (and processed into the contract text 306 by the OCR module 304 before being provided to the semantic cross-compiler 308). The parser output 312 may contain multiple data objects each including portions of the contract text 306 associated with a date of the agreement 204, the lessor party identification 206, a lessor contact information 207, a lessee party identification 208, a lessee contact information 210, the consideration requirements 212, and other obligations and requirements 216 under the agreement. These data objects can be transmitted to the converter 314 as elements of the parser output 312.

The converter 314 may translate the contents of the parser output 312 into respective variable declarations and/or executable rules which may be provided as a converter output 314 to the aggregator 318. The converter 314 can use rules-based, model-based, probabilistic, and mixed methods to properly construct variable declarations and other executable instructions. For example, the converter 314 may process the date of the agreement 204 into an "execution date" object declaration instruction 254. In some cases, multiple variables may be declared as a single object. Here, the converter 314 can produce a single "parties" object declaration instruction 256 from the lessee party identification 206 and the lessor party identification 208. The "parties" object declaration instruction 256 may create a data object within the smart contract 252 that names all parties to the agreement at once.

In some examples, data objects can be nested within other data objects. For example, the converter 314 may generate a "lessor address" object 258 and a "lessee address" object 260 from the lessor contact information 207 and the lessee contact information 210. The "lessor address" data object 258 and the "lessee address" data object 260 may each be nested within the "parties" data object produced by the "parties" object declaration instruction 254. In such a case, a sequential ordering of the declaration instructions may be enforced by the aggregator 318 in order to ensure proper software execution of functions and generation of the data objects.

The converter 314 can also generate software executable functions 270 and 272 from obligations within the contract such as the consideration requirement 212 and other obligations and requirements 216. The resultant code may depend upon the particular obligation. For example, the obligation instruction 270, generated by the converter 314, can include code to set a Boolean value denoting whether or not the smart contract has been properly executed to be "TRUE" if a described sum of money (e.g., in the conventional contract 202) has been recorded passing between a lessor and lessee account in a particular direction by the execution date 254.

The converter 314 can transmit the variable declarations and rules instructions 316 to the aggregator 318 for correct ordering and assemblage into a software executable smart contract 320. The aggregator 318 may receive the variables declarations and rules instructions 316 without any particular ordering and thus may process the material into a correctly ordered sequence of instructions. Further, where additional variable declarations are necessary for successful operation of the smart contract, the aggregator 318 can identify what additional variables are needed and where in the ordered sequence to insert their declaration. For example, a "termsPerformance" Boolean 262 can be generated which denotes whether the software executable rules instructions 270 and 272 successfully executed. Further instructions may be generated for providing notification when the termsPerformance Boolean 262 changes from "TRUE" to "FALSE." Additionally, the aggregator 318 can provide further comments 268 and 266 to facilitate ease of human review of the smart contract 252. Comments can be non-executable descriptive text within the otherwise software executable code of the smart contract 252. The comments can include descriptions and explanations of nearby variables and functions for easier human review of the software executable code.

In some examples, the aggregator 318 can generate a dependency tree based on explicit or implicit relationships in the variable declarations and rules instructions 316 provided by the converter 314. Using, for example, a topological sorting method, the dependency graph can be converted into executable ordered code to produce the smart contract 320. In other examples, the aggregator 318 can perform a bug check or code audit within, for example, a sandboxed environment using dummy values in order to validate the smart contract 320 before transmitting it downstream.

Figure 4:
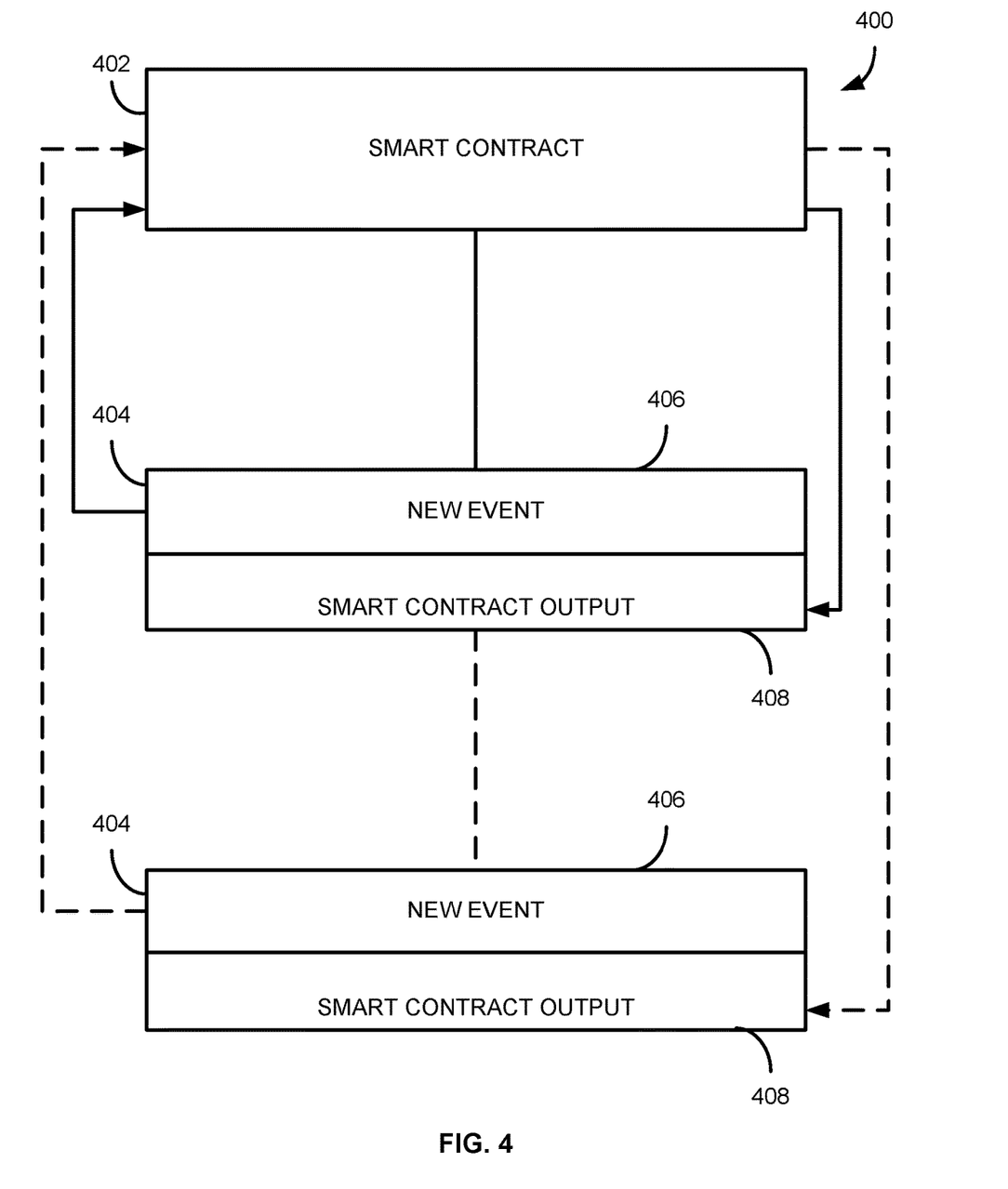
FIG. 4 is a diagram illustrating a smart contract blockchain data structure, in accordance with various embodiments of the subject technology.

Having compiled the smart contract 320, the semantic cross-compiler 308 can provide the smart contract 320 to a blockchain network 322. In some examples, the semantic cross-compiler 308 can instead provide the smart contract 320 to each of the parties and/or a third party contract executor (not depicted). Regardless, the smart contract 320 may then be performed, either once or continuously, by the blockchain network 322 or whichever recipient receives it. Further, the smart contract 322 may become a root node 102 of a blockchain data structure 100 associated solely with the particular smart contract 322. FIG. 4 depicts one example of such a case and is discussed below.

FIG. 4 depicts a blockchain 400 for a smart contract produced by the converter system 300. The blockchain 400 includes a root node 402 and an arbitrarily large number of appended blocks 404 in sequence. In some examples, the blockchain 400 can be stored across a distributed ledger. In other examples, the blockchain 400 may be stored on a single entity or small number of entities (for example, the parties to the agreement).

The root node 402 includes, for example, the smart contract 322 produced by the converter system 300. In some examples, the root node 402 may contain other contextual data such as date of upload or country of law and the like.

Each block 404 can include a new event record 406 and an output record 408. The smart contract may generate the output record 408 by processing information related to the event of the new event record 406. The new event record 406 may include information from one or more different sources. For example, the new event record 406 can include data received from hardware or various physical components out in the world such as drill heads, reservoir probes, or pump stations and the like. The new event record 406 can instead or also include information from primarily digital sources such as bank accounts and the like. In some cases, the new event record 406 may include data retrieved from third-party application programming interfaces ("APIs"). For example, an API, sometimes called an "oracle", may be used to verify company valuation or sales records and the like.

The new event record 406 can be preserved in the block 404 as well as processed by the smart contract of the root node 402. The smart contract may process the new event record 406 in accordance with the instructions generated by the converter system 300. In some cases, the new event record 406 will cause the smart contract to generate a smart contract output 408 with, for example, alerts and the like. In some examples, the smart contract may also produce internal state changes, such as new party identification values in the case of new parties being added to the smart contract or the smart contract being assigned to a new party. In such a case, the smart contract in the root node 402 may update with the new variable information and a record of the state change may also be included in the smart contract output 408.

Figure 5:
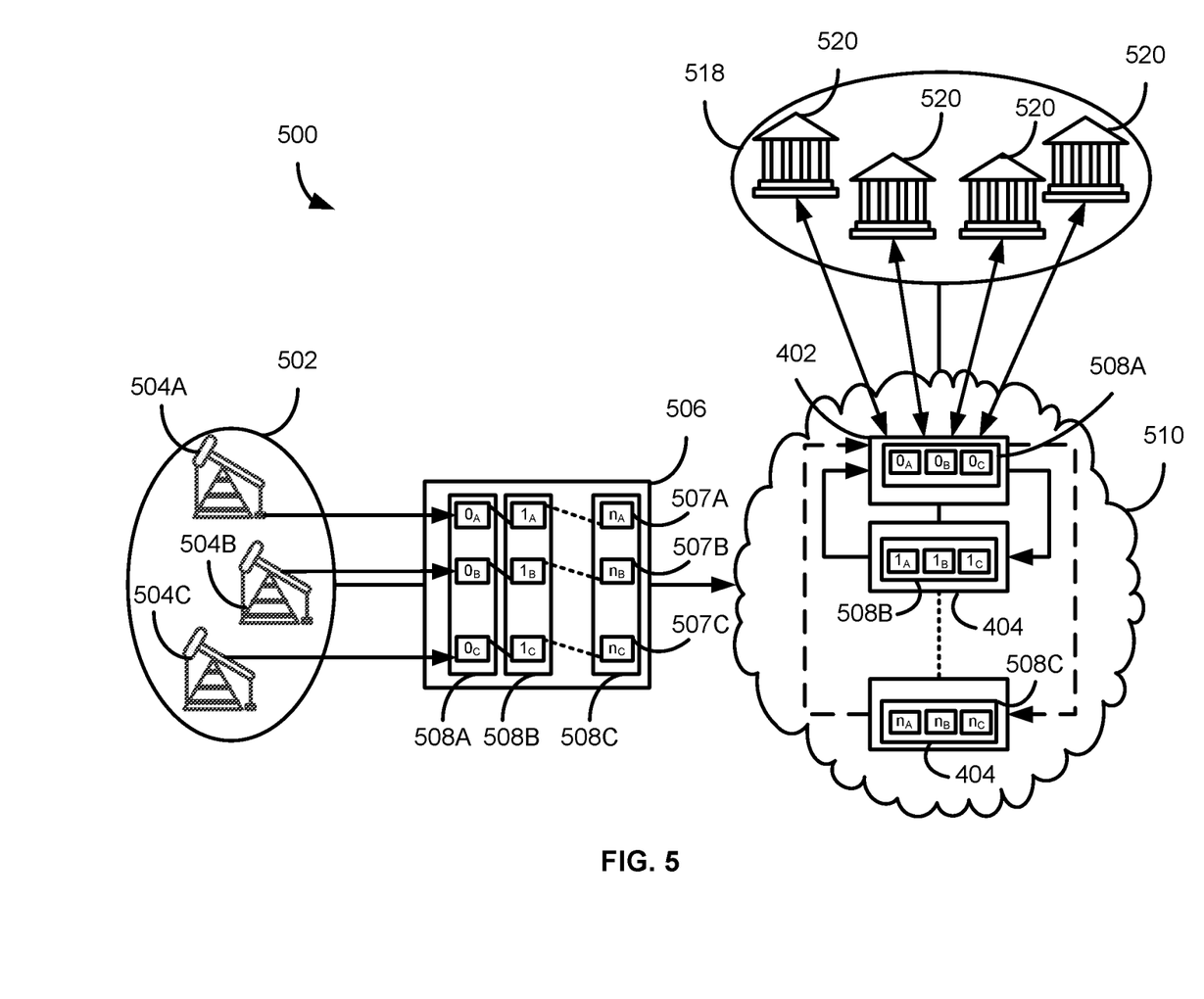
FIG. 5 is a system diagram illustrating a smart contract system, in accordance with various embodiments of the subject technology.

FIG. 5 depicts a system 500 for managing a smart contract blockchain which interacts with data feed blockchains. By including a blockchain for each data source, event records can be cross-referenced across multiple blockchains, each recording a history of events, thus validating the integrity or veracity of each event record of the smart contract blockchain. Further, the cross-references across blockchains can be performed in an automated manner in order to provide a more responsive and efficient system of contract management without sacrificing granularity of the contractual terms.

A collection 502 of devices such as, for example and without imputing limitation, oil wells can include an arbitrary number of drills 504A-C. Drills 504A-C may include sensors reporting various data such as drill depth, pressure, reservoir statistics, production statistics (e.g., daily output, output rate, uptime, etc.), and the like. In some examples, data can be reported by an intermediary reporter such as, for example, a modeling service which may output a stream of prediction data based on input data including the sensor data.

Each drill 504A-C can transmit associated data streams (e.g., sensor data, modeled data, etc.) to a recorder 506 which may be a data store and/or processing system. In some examples, the recorder 506 may be provided on-site alongside the drills 504A-C. In other examples, the recorder 506 may be provided as a remote hosted service, such as through a cloud provider and the like. Further, the data store 506, though depicted here as a single resource and service, may be provided as a distributed service or across multiple resources managed by a management service or resource in order to maintain concurrency between data sources.

Here, the data streams are processed by the recorder 506 and configured into blockchains 507A-C. The blockchains 507A-C may be configured as described above and can include an arbitrary number of constituent blocks. In some examples, the blockchains 507A-C may be a limited window and may provide only a number of blocks as necessary to maintain an immutable record of outputs stretching back a particular amount of time. Further, the blocks of the reporting blockchains 507A-C can maintain concurrency, as highlighted by groupings 508A-C across the blocks if the blockchains 507A-C. In some examples, the groupings 508A-C can occur implicitly by, for example, determining the grouping based on the sequence within the blockchain itself (e.g., all 0-blocks are grouped, all 1-blocks are grouped, etc.) or by a date stamp or similar metadata included within each block itself. In other examples, the groupings 508A-C may be explicitly provided by, for example, the metadata of each block (e.g., each block contains a "group ID" or the like).

The recorder 506 may provide the blockchains 507A-C to a blockchain network 510. In some examples, the blockchain network 510 may be a distributed network. In other examples, the blockchain network 510 may consist of a single party or a group of parties agreed upon by entities associated with the collection 502 of resources or a smart contract, here stored as a root block 402, maintained as a blockchain by the blockchain network 510.

The blockchain network 510 can retrieve the groupings 508A-C from each blockchain 507A-C and insert each grouping into an appropriate block 404 or root block 402. The groupings 508A-C can further be provided to the smart contract stored in the root block 402 and any state changes or output can be recorded in the block 404 storing the associated grouping. Here, the root block 402 further includes the initial grouping 508A. In some example, the initial grouping 508A can be used to set baseline values or otherwise provide context which the smart contract may utilize with later received groupings 508B-C.

Furthermore, the smart contract stored in the root block 402 may interact with institutions 518 which can include multiple entities 520 such as banks, contracting party alert systems, commercial API services, and the like. By receiving reporting data from the collection 502 of devices in the form of blockchains 507A-C and interacting with institutions 518, the smart contract of root node 402 can automatically and efficiently maintain contractual obligations, update parties, and record an immutable history of events and actions without requiring direct human interaction.

Figure 6:
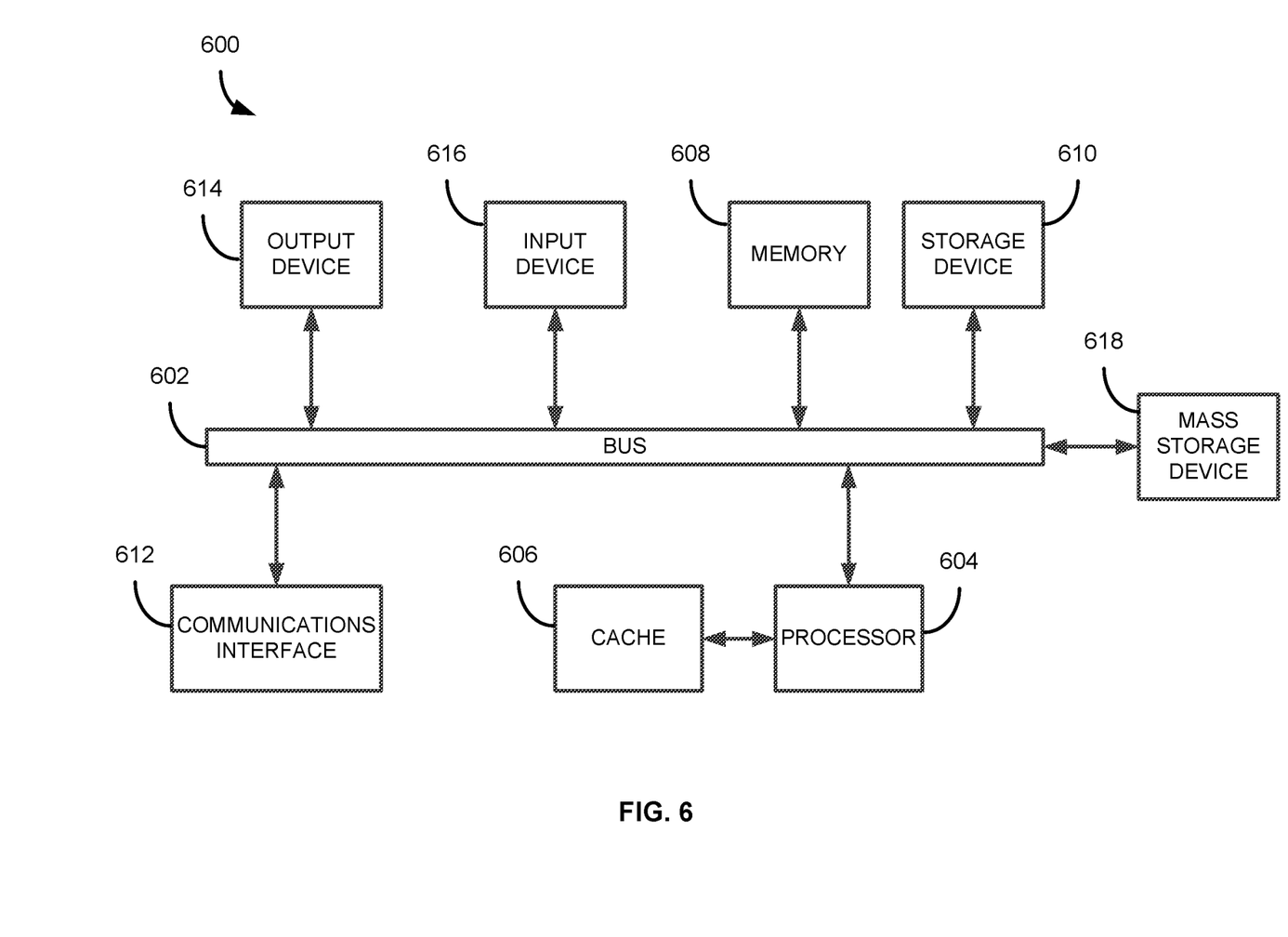
FIG. 6 is a system diagram of an example computing system that may implement various systems and methods discussed herein, in accordance with various embodiments of the subject technology.

FIG. 6 is an example computing system 600 that may implement various systems and methods discussed herein. The computer system 600 includes one or more computing components in communication via a bus 602. In one implementation, the computing system 600 includes one or more processors 604. The processor 604 can include one or more internal levels of cache 606 and a bus controller or bus interface unit to direct interaction with the bus 602. The processor 604 may specifically implement the various methods discussed herein. Main memory 608 may include one or more memory cards and a control circuit (not depicted), or other forms of removable memory, and may store various software applications including computer executable instructions, that when run on the processor 604, implement the methods and systems set out herein. Other forms of memory, such as a storage device 610 and a mass storage device 618, may also be included and accessible, by the processor (or processors) 604 via the bus 602. The storage device 610 and mass storage device 618 can each contain any or all of the methods and systems discussed herein.

The computer system 600 can further include a communications interface 612 by way of which the computer system 600 can connect to networks and receive data useful in executing the methods and system set out herein as well as transmitting information to other devices. The computer system 600 can also include an input device 620 by which information is input. Input device 616 can be a scanner, keyboard, and/or other input devices as will be apparent to a person of ordinary skill in the art. An output device 614 can be a monitor, speaker, and/or other output devices as will be apparent to a person of ordinary skill in the art.

The system set forth in FIG. 6 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the methods can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer. The computer-readable storage medium may include, but is not limited to, optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions.

The description above includes example systems, methods, techniques, instruction sequences, and/or computer program products that embody techniques of the present disclosure. However, it is understood that the described disclosure may be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

We claim:

1. A system for converting a natural language contract into a computer-executable smart contract, the system comprising:
    a hardware processor; and
    a memory storing instructions that, when executed by the hardware processor, cause the hardware processor to:
        parse a natural language text to generate a parsed variable and a parsed instruction code based on a semantic content included in the natural language text;
        generate a data object and a new instruction code based on one of the parsed variable and the parsed instruction code;
        nest the data object within a subject data object, the subject data object comprising a plurality of corresponding data objects each comprising a related parsed variable of the natural language text;
        generate a smart contract comprising the parsed variable, the parsed instruction code, and the one of the new variable and new instruction code, the smart contract structured in a sequentially ordered manner for machine execution based on the subject data object comprising the nested data object;
        receive concurrently occurring data from a plurality of data producing sources and corresponding to an event associated with the smart contract, each of the data producing sources transmitting a stream of operational data to a recorder;
        generate a first blockchain wherein each block of the first blockchain comprises a group of concurrently occurring data from the plurality of data producing sources;
        generate a block in a second blockchain comprising a new event record comprising concurrently occurring data obtained from a block of the first blockchain corresponding to a date variable of the smart contract and an output of the smart contract based on processing the concurrently occurring data based on the smart contract, the output comprising an internal state change of the smart contract in relation to the obtained concurrently occurring data; and
        update the smart contract with the internal state change based on the obtained concurrently occurring data.

2. The system of claim 1, wherein the memory stores additional instructions that, when executed by the hardware processor, further cause the hardware processor to transmit the smart contract to a blockchain network.

3. The system of claim 1, wherein the smart contract is a root node of the blockchain.

4. The system of claim 3, wherein the second blockchain is a private blockchain that may be viewed by only authorized parties.

5. The system of claim 3, wherein the memory stores additional instructions that, when executed by the hardware processor, further cause the hardware processor to generate a block data structure comprising one of a record of an execution of a term of the smart contract or a record of information related to one of the term of the smart contract or an obligation of the smart contract.

6. The system of claim 1, wherein the smart contract changes a state of one of the parsed variable or the new variable based on execution of one of the parsed instruction code or the new instruction code.

7. The system of claim 6, wherein changing the state of one of the parsed variable or the new variable further comprises storing the changed state in a block data structure depending from the smart contract by a hash value.

8. A non-transitory computer readable medium which, when executed by one or more processors, causes the one or more processors to:
   parse a natural language text to generate a parsed variable and a parsed instruction code based on a semantic content included in the natural language text;
   generate a data object and a new instruction code based on one of the parsed variable and the parsed instruction code;
   nest the data object within a subject data object, the subject data object comprising a plurality of corresponding data objects each comprising a related parsed variable of the natural language text;
   generate a smart contract comprising the parsed variable, the parsed instruction code, and the one of the new variable and new instruction code, the smart contract structured in a sequentially ordered manner for machine execution based on the subject data object comprising the nested data object;
   receive concurrently occurring data from a plurality of data producing sources and corresponding to an event associated with the smart contract, each of the data producing sources transmitting a stream of operational data to a recorder;
   generate a first blockchain wherein each block of the first blockchain comprises a group of concurrently occurring data from the plurality of data producing sources;
   generate a block in a second blockchain comprising a new event record comprising concurrently occurring data obtained from a block of the first blockchain corresponding to a date variable of the smart contract and an output of the smart contract based on processing the concurrently occurring data based on the smart contract, the output comprising an internal state change of the smart contract in relation to the obtained concurrently occurring data; and
   update the smart contract with the internal state change based on the obtained concurrently occurring data.

9. The non-transitory computer readable medium of claim 8, which further causes the one or more processors to transmit the smart contract to a blockchain network.

10. The non-transitory computer readable medium of claim 8, wherein the smart contract is a root node of the blockchain.

11. The non-transitory computer readable medium of claim 10, wherein the second blockchain is a private blockchain that may be viewed by only authorized parties.

12. The non-transitory computer readable medium of claim 10, which further causes the one or more processors to generate a block data structure comprising one of a record of an execution of a term of the smart contract or a record of information related to one of the term of the smart contract or an obligation of the smart contract.

13. The non-transitory computer readable medium of claim 8, wherein the smart contract changes a state of one of the parsed variable or the new variable based on execution of one of the parsed instruction code or the new instruction code.

14. The non-transitory computer readable medium of claim 13, wherein changing the state of one of the parsed variable or the new variable further comprises storing the changed state in a block data structure depending from the smart contract by a hash value.

15. A method for converting a natural language contract into a computer-executable smart contract, the method comprising:
   parsing a natural language text to generate a parsed variable and a parsed instruction code based on a semantic content included in the natural language text;
   generating a data object and a new instruction code based on one of the parsed variable and the parsed instruction code;
   nesting the data object within a subject data object, the subject data object comprising a plurality of corresponding data objects each comprising a related parsed variable of the natural language text;
   generating a smart contract comprising the parsed variable, the parsed instruction code, and the one of the new variable and new instruction code, the smart contract structured a sequentially ordered manner for machine execution based on the subject data object comprising the nested data object;
   receiving concurrently occurring data from a plurality of data producing sources and corresponding to an event associated with the smart contract, each of the data producing sources transmitting a stream of operational data to a recorder;
   generate a first blockchain wherein each block of the first blockchain comprises a group of concurrently occurring data from the plurality of data producing sources;
   generating a second block in a blockchain comprising a new event record comprising concurrently occurring data obtained from a block of the first blockchain corresponding to a date variable of the smart contract and an output of the smart contract based on processing the concurrently occurring data based on the smart contract, the output comprising an internal state change of the smart contract in relation to the obtained concurrently occurring data; and
   updating the smart contract with the internal state change based on the obtained concurrently occurring data.

16. The method of claim 15, further comprising transmitting the smart contract to a blockchain network.

17. The method of claim 15, wherein the smart contract is a root node of the blockchain.

18. The method of claim 17, wherein the second blockchain is a private blockchain that may be viewed by only authorized parties.

19. The method of claim 15, further comprising generating a block data structure comprising one of a record of an execution of a term of the smart contract or a record of information related to one of the term of the smart contract or an obligation of the smart contract.

20. The method of claim 15, wherein the smart contract changes a state of one of the parsed variable or the new variable based on execution of one of the parsed instruction code or the new instruction code and stores the changed state in a block data structure depending from the smart contract by a hash value.

* * * * *